No. 811,951. PATENTED FEB. 6, 1906.
P. M. PIERSON.
GREENHOUSE AND OTHER GLAZED STRUCTURE.
APPLICATION FILED MAY 7, 1903.
2 SHEETS—SHEET 1.
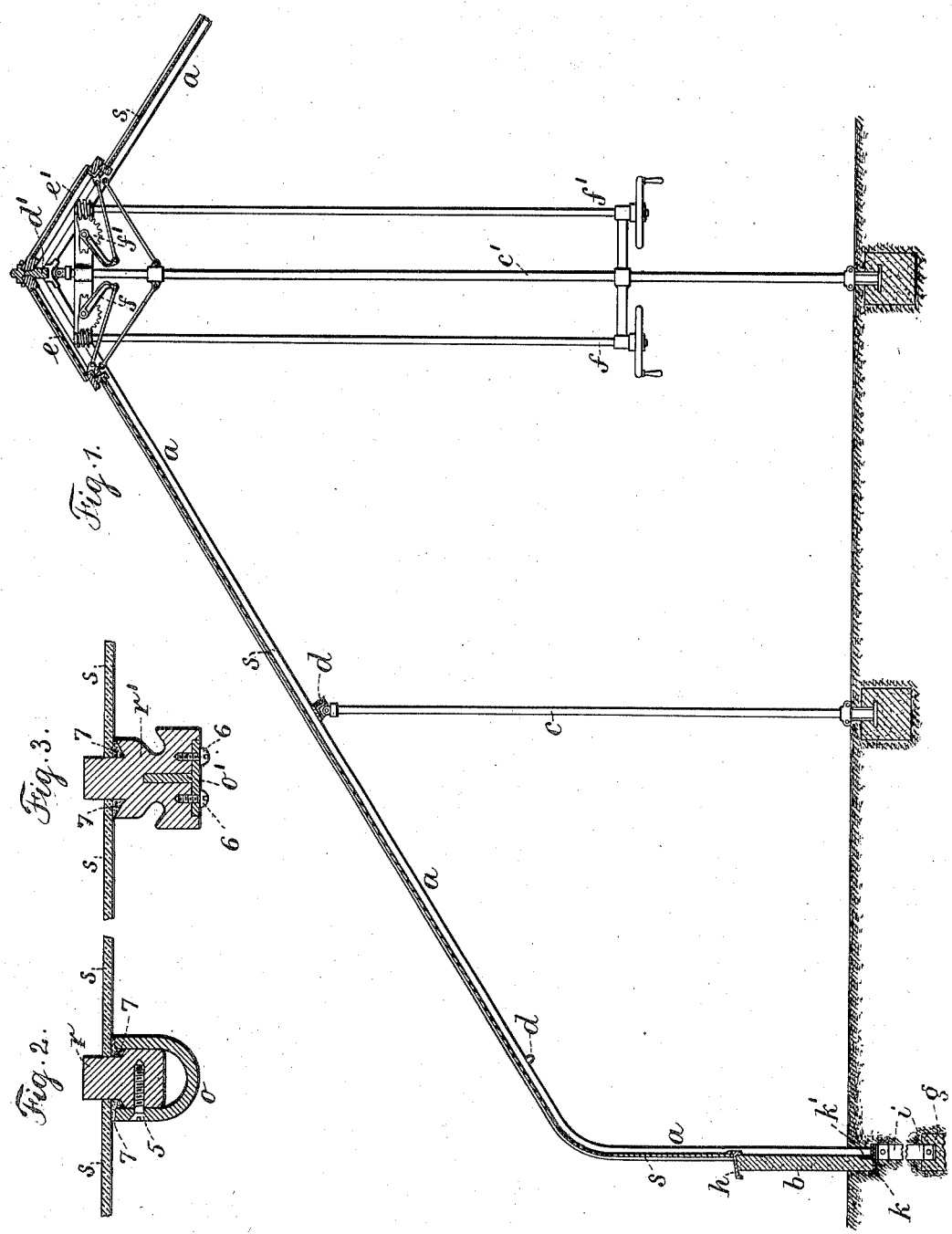
Witnesses:
J. Staib
Schart Smith
Inventor:
Paul M. Pierson
per Harold Sewell atty.

No. 811,951. PATENTED FEB. 6, 1906.
P. M. PIERSON.
GREENHOUSE AND OTHER GLAZED STRUCTURE.
APPLICATION FILED MAY 7, 1903.
2 SHEETS—SHEET 2.
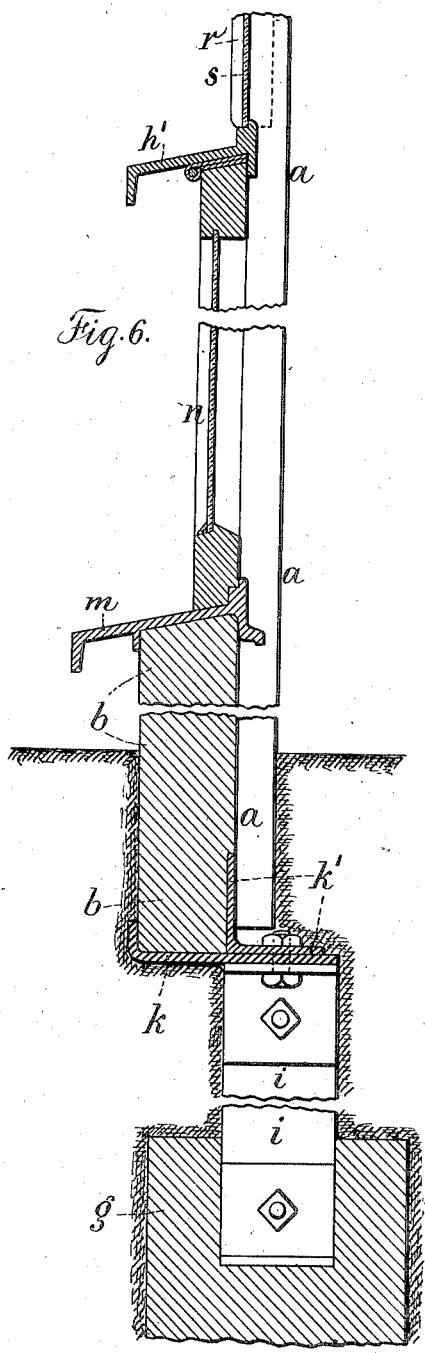
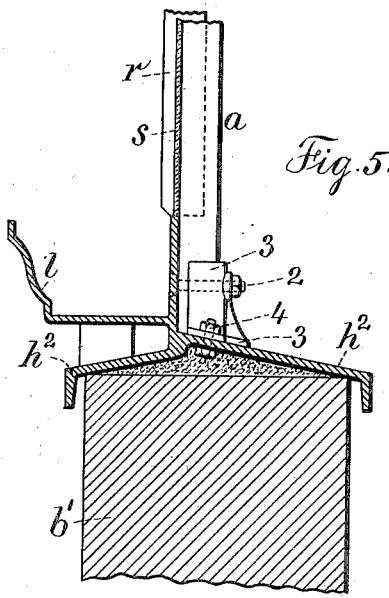
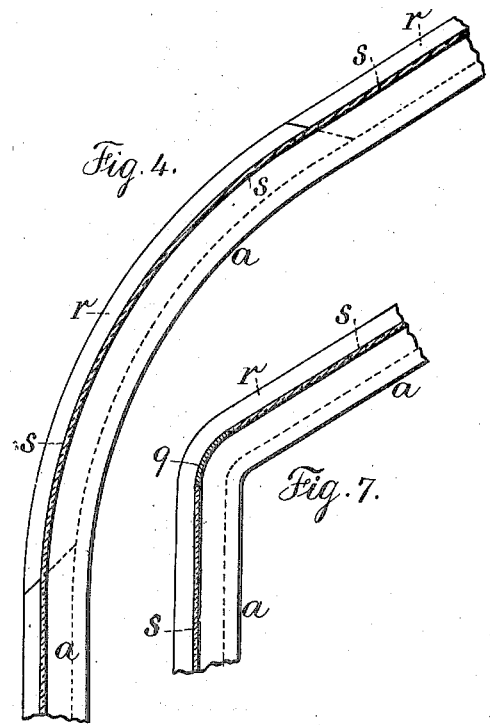
Witnesses:
Inventor:
Paul M. Pierson
per Harold Serrell atty

UNITED STATES PATENT OFFICE.

PAUL M. PIERSON, OF OSSINING, NEW YORK, ASSIGNOR TO THE PIERSON-SEFTON COMPANY, OF JERSEY CITY, NEW JERSEY, A CORPORATION OF NEW JERSEY.

GREENHOUSE AND OTHER GLAZED STRUCTURE.

No. 811,951.      Specification of Letters Patent.      Patented Feb. 6, 1906.

Application filed May 7, 1903. Serial No. 155,996.

*To all whom it may concern:*

Be it known that I, PAUL M. PIERSON, a citizen of the United States, residing at Ossining, in the county of Westchester and State of New York, have invented an Improvement in Greenhouses and other Glazed Structures, of which the following is a specification.

In greenhouses as heretofore constructed with vertical sides of appreciable height the sash-bars have rested upon and been supported by a girder or bearer coming at the intersection of the vertical sides and sash-bars, and to this girder a cornice and gutter have usually been connected on the outside. These parts have cast an appreciable shadow on the plants within the greenhouse; and the object of my invention is to obviate this shadow, to lighten the appearance of the structure, and to dispense with numerous parts.

In carrying out my invention I employ sash-bars that are continuous—that is to say, each sash-bar comprises inclined and vertical portions with a curved intersection. The bars are preferably integral or unbroken from the sill of the said foundation to the ridge of the roof to a termination-plate or to the line of the top ventilating-sashes. The glazing is also preferably continuous along and between the bars. Each bar preferably comprises a metal part or bar and a coacting and connected wooden bar. I may employ for this bar the forms shown in Letters Patent granted to me April 15, 1902, Nos. 697,746, and 697,747 or the form shown in my application for Letters Patent, Serial No. 69,373, filed July 23, 1901. The glazing is connected to the wooden part of this bar, and a part of this bar extends between and beyond the glazing.

In the drawings, Figure 1 is a vertical cross-section representing slightly more than half of a greenhouse structure according to my invention. Figs. 2 and 3 are cross-sections of forms of sash-bars adapted for my improved structure and which sash-bars are those shown and described in my aforesaid patent and application. Fig. 4 is a side elevation representing parts of the vertical and inclined parts and the intersecting part of the sash-bar and a section of the glazing. Fig. 5 is a vertical cross-section at the lower end of the sash-bar, showing a form of support of the same upon a foundation. Fig. 6 is a vertical section through a form of foundation for a greenhouse structure to which my sash-bar is applicable, and Fig. 7 is a side elevation representing a length of modified form of bar at the intersection and section of the glazing.

$a$ represents the sash-bars. Each sash-bar comprises inclined and vertical portions with a curved integral intersection, forming a substantially continuous bar, the inclined portion representing the top or roof of the greenhouse structure, the vertical part the side above the foundation, and the curved part the intersection continuously formed with the inclined and vertical parts.

$b$ represents a foundation; $c$ $c'$, vertical posts within the greenhouse structure supported on suitable foundations and connected at the upper ends to purlins $d$ or to the base of the ridge-bar $d'$.

In Fig. 1, $e$ $e'$ represent ventilating-sashes on opposite sides of the ridge-bar $d'$, and $f f'$ are manually-operated devices for raising and lowering the ventilating-sashes $e$ $e'$, which are of usual construction. These manually-operated devices $f f'$ are also well known and of usual construction and are simply illustrated for the purpose of showing the complete structure and form no essential part of my present invention.

The foundations $b$ $b'$ may be of concrete, brick, or other suitable material, and they may rise to any convenient or suitable distance from the ground and pass into the ground any convenient or suitable distance, as the character of the foundation forms no part of the present invention. In Figs. 1 and 6 a subfoundation $g$ is shown, into which are secured posts $i$ at intervals. These posts support and have connected to them continuous angle-iron plates $k$ $k'$, the plate $k$ being of greater width than the plate $k'$ and the plate $k'$ having a larger member at right angles to the horizontal portion, so that between the upright portions or flanges of the said plates is received and supported the foundation $b$. This is a convenient form of structure, wherein the foundation of the greenhouse structure is carried far below the frost-line, while in Fig. 5 $b'$ represents a foundation which may simply pass into and rest upon the ground near the surface.

In Fig. 1, $h$ represents a sill of metal resting upon and which may be secured to the foundation $b$ in any desired manner. With reference to Fig. 5, $h^2$ represents a sill-plate of metal resting upon the foundation $b'$ and to which a gutter structure $l$ is connected in any desired manner for carrying away the water from the outside of the greenhouse structure. In this figure I have shown a metal shoe 3 as surrounding the base of the sash-bar $a$ and as connected to the said sash-bar and to the upright member of the sill by a bolt 2, which passes through the parts, the shoe in turn being connected to the sill by a bolt 4.

In Fig. 6, $m$ represents an auxiliary sill-plate on top of the foundation $b$, and $h'$ a sill-plate which is the equivalent of the sill-plate $h$, Fig. 1, and between which sill-plate $h'$ and the auxiliary sill-plate $m$ there is a side ventilating-sash $n$. These ventilating-sashes are usually low and long and are hinged to the upper sill. They are sometimes used, but more frequently dispensed with, and the several figures of the illustration are made to show the possibilities of my improved sash-bar.

In Fig. 2, $o$ represents a U-bar of metal; $r$, a wooden bar received within the metal bar and secured thereto by a screw 5, the central portion of the wooden bar $r$ being reduced and projecting between the glass plates $s$, there being lines of putty 7 in the intersections between the wooden and metal bars in which the glasses are embedded. This bar, Fig. 2, is one of the forms of sash-bar shown in my aforesaid patent.

In Fig. 3, $o'$ represents a T-bar of metal; $r'$, a wooden bar with a centrally-reduced part to pass between the glass plates $s$ and with adjacent grooves for putty 7, into which the glasses are embedded. This bar is shown as provided with moisture-troughs along opposite sides, and the T-bar is let into the wooden bar from the under side and is secured thereto by screws 6. This bar, Fig. 3, is the bar shown and described in my aforesaid application, Serial No. 69,373. Either form of bar is adapted for use as a continuous sash-bar for greenhouses such as shown in Fig. 1, and I do not limit myself to which form of bar I employ, although heretofore I have usually employed the form shown in Fig. 2.

In the employment of this sash-bar for greenhouses I prefer to stop the wooden member of the bar at the border of the ventilating-sash $e\ e'$, Fig. 1, and to continue the metal part of the bar up to connection with the ridge-bar, and I also prefer at the foundation-line to stop the wooden part of the bar and to continue the metal part down to a secure fastening with sill or with the angle-iron plates which form part of the foundation.

In Fig. 1 the wooden part of the sash-bar stops at the sill $h$, while the metal part continues on down to the angle-plates $k\ k'$.

In Fig. 5 the wooden part of the bar stops at the upper edge of the vertical part of the sill $h^2$, while the metal part of the bar continues down within this metal part of the sill to a connection with a shoe 3, and in this case the bolt 2 passes through the metal bar, through the shoe, and through the vertical part of the sill.

In Fig. 6 the wooden part $r$ of the bar stops at the sill $h'$ and the metal part continues down within the sill $h'$ at the intersections of the series of side ventilating-sashes usually employed and illustrated by the side ventilating-sash $n$, past the auxiliary sill $m$, down within the foundation $b$ to the upper portion of the angle-plate $k'$ in an effort to increase the stiffness of the structure.

In Fig. 4 I have shown the curved intersection with the inclined and vertical parts of the sash-bar, in which structure the metal part of the sash-bar is bent and the wooden part is advantageously cut out of a solid piece and of curved form to connect with the ends of the inclined and vertical wooden parts fitting within the metal part, the meeting edges being inclined, preferably, as shown in Fig. 4, not only for the purpose of shedding the water, but to facilitate a secure connection at the meeting ends of the wooden part.

The glass plates or glazing $s$ of my improvement are continuous from the foundation or sill plate to the ventilating-sash to a termination-plate or ridge-bar of the greenhouse structure, and at the curved portion these glass plates may be narrow or the entire curved portion may be made of one or more glass plates. In all cases, however, the edges are abutted, or the lower edge of each glass plate will be lapped over the upper edge of each adjacent plate, conforming to the usual manner of laying these glass plates.

In my improvement a minimum of space is occupied by the structure, so that a maximum of light and sunshine is obtained within the house, and there are no parts, such as the usual gutter or cornice at the intersection of the vertical and inclined parts, to cast appreciable shadows and interfere with the growth of the plants.

The modification Fig. 7 is illustrated for the purpose of indicating that the intersecting portion between the vertical and inclined portions of the sash-bar may be made with a very sharp bend, or, in other words, upon a small radius, too small a radius to employ bent plates of glass. In this event the glasses of the inclined and vertical portions are connected by a narrow plate of metal 9, the edges of which may be abutted against the plates of glass at either side or the joints lapped.

The following may be stated as among the advantages to be gained by the employment of this form of structure for greenhouses and and other glazed structures: The external as well as the internal appearance of the house is enhanced and a more graceful structure produced. The collection of icicles in winter is prevented, because there is no gutter and no eaves exterior of the house and intersecting a portion of the glass. There is no decay of exposed cornice members, which is usual in greenhouses of ordinary character, as these parts are absent. There is no structure which makes it possible for water to collect and freeze under the last glass and by the expansion produced by freezing crack the glass. There is no structure that permits sliding snow to back up, collect, cover the glass, and interfere with the entrance of the sunlight, nor is it possible for snow to collect, so as to add to the weight of the structure. In the present structure the water or drip on the under surface follows the glass all the way down to the sill and simply flows away, while heretofore at the angle produced between the inclined and vertical portions the water or drip would spatter away from the structure back onto the plants and would cause injury thereto. With this structure, furthermore, side drafts of cold air are prevented.

Ventilating-sashes in one or more series along and at either or both sides of the ridge-bar of a greenhouse are usually employed, but are frequently wholly dispensed with, and therefore I do not herein limit myself to the employment of any ventilating-sashes in the roof portion of the greenhouse or other glazed structure.

By the use of the word "intersection" herein employed I mean the curved portion of the metal and wooden parts of the sash-bar (shown in Figs. 1, 4, and 7) that intervenes or comes between, and which part is substantially integral with the vertical sides and inclined top.

I claim as my invention—

1. In a greenhouse or similar glazed structure, a series of sash-bars substantially continuous and extending unbroken from the foundation to a point adjacent to the ridge-bar, and each comprising a bent form of metal bar for strength and a part connected thereto and to which the glasses are in turn connected, said bars each including the short vertical side, the inclined top and curved intersection.

2. In a greenhouse or similar glazed structure, a series of sash-bars substantially continuous and extending unbroken from the foundation to a point adjacent to a termination-plate, and each comprising a bent form of metal bar for strength and a part connected thereto and to which the glasses are in turn connected, said bars each including the short vertical side, the inclined top and curved intersection, and with plates of glass contacting at the meeting edges and extending between the sash-bars and continuous for the length of said complete bars.

3. In a greenhouse or similar glazed structure, a series of sash-bars substantially continuous and extending unbroken from the foundation approximately to the center ridge-bar and each comprising a form of metal of bent cross-section for strength, and a wooden bar coacting and lying parallel with and connected to the metal bar and constructed to receive the plates or lights of glass, and each of which sash-bars includes the short vertical side, the long inclined top part and curved intersection.

4. In a greenhouse or similar glazed structure, a series of sash-bars substantially continuous extending unbroken from the foundation approximately to the center ridge-bar and each comprising a form of metal of U shape in cross-section for strength, and a wooden bar received in and coacting with the metal bar lying parallel with and connected to the metal bar and having a projecting rib of narrower width with side shoulders to receive putty as seats for the plates or lights of glass, and each of which sash-bars includes the short vertical side, the long inclined top part and curved intersection.

5. In a greenhouse or other glazed structure, a series of sash-bars substantially continuous and each comprising the short vertical sides, the inclined top and curved intersection, and each bar consisting of a metal part for strength and a wooden part parallel and continuous, the wooden part at one end stopping at the sill and at the other end at the ventilating-sashes near the top, and the metal bar continuing at the top to a connection with the ridge-bar and at the other and lower end to connection with the foundation.

6. In a greenhouse or similar glazed structure, a series of sash-bars each comprising a short vertical side, an inclined top and curved intersection, and composed at the curved intersection and adjacent portions of an inner or under part of metal and an outer part of wood.

7. In a greenhouse or similar glazed structure, a series of sash-bars substantially continuous and extending from the foundation to a point adjacent to the ridge-bar and each comprising a bent form of metal for strength and a part connected thereto and to which the glasses are in turn connected, said bars each including the short vertical side, the inclined top and curved intersection, and plates of glass between the sash-bars from end to end forming a continuous surface of glass.

Signed by me this 4th day of May, 1903.

PAUL M. PIERSON.

Witnesses:
 GEO. T. PINCKNEY,
 S. T. HAVILAND.